United States Patent [19]

Bertozzi

[11] 4,165,425

[45] Aug. 21, 1979

[54] ALKYL TIN OXIDE CURED POLYSULFIDE RUBBERS IN HOT MELT APPLICATIONS

[75] Inventor: Eugene R. Bertozzi, Yardley, Pa.

[73] Assignee: Thiokol Corporation, Newtown, Pa.

[21] Appl. No.: 913,626

[22] Filed: Jun. 8, 1978

[51] Int. Cl.² ............................................. C08G 75/04
[52] U.S. Cl. ................................ 528/374; 264/176 R; 264/236; 264/331; 264/347; 427/355; 427/385 R; 427/385 A; 427/388 R; 428/419; 428/426; 428/457; 528/388
[58] Field of Search ................ 528/374, 388; 264/176, 264/236, 331, 347; 427/355, 385 R, 385 A, 388 R; 428/419, 426, 457

[56] References Cited

U.S. PATENT DOCUMENTS 3,243,403  3/1966  Vondy et al. .................... 260/37 R Primary Examiner—Melvyn I. Marquis
Attorney, Agent, or Firm—Stanley A. Marcus; Royal E. Bright

[57] ABSTRACT

The use of polysulfide rubbers cured with dilower alkyl tin oxides in hot applied processes and articles formed thereby are disclosed. The compositions are useful as hot applied sealants and in the extrusion of hoses and similar rubber articles.

6 Claims, No Drawings

ALKYL TIN OXIDE CURED POLYSULFIDE RUBBERS IN HOT MELT APPLICATIONS

BACKGROUND OF THE INVENTION

This invention relates to the art of polysulfide polymers, more particularly to thiol terminated liquid polysulfide polymers and hot melt applications, such as, hot melt applied sealants, extrusion of hoses and the like.

The use of thiol terminated liquid polysulfide polymer in caulks, sealants, and the like for numerous applications is well known. Such materials have normally, until now, been applied as liquids and chemically cured to solids in situ.

If rapid cure was desired, a two part system was employed, requiring mixing with proper equipment just before use. One part chemical cure, on the other hand, was satisfactory in avoiding the need for in situ mixing but inherently was a slower cure requiring that provision be made for time to reach structural integrity, in some uses requiring provision of storage facilities, support racks and the like. In production applications, the extra space and/or equipment required by either cure mechanism added a cost factor whose elimination would be considered desirable by those skilled in the art.

Hot melt applied materials offer the potential to avoid both the two part chemical cure requirement of in situ mixing and the lengthy holding requirement of one part chemical cure.

Although polysulfide rubbers are classified along with most other natural and synthetic rubbers as thermoplastic materials, they have always been considered as sharing the property of most rubbers that once vulcanized they cannot be induced to flow under heat and pressure without extensive degradation of the basic polymeric chain and consequent permanent loss of most or all physical properties.

Until now, the available hot melt sealants, such as butyl based materials, have not exhibited good structural properties on cooling and have required cumbersome mechanical retention systems or the application of a second curable sealant with adequate mechanical properties where structural support is required as in insulated glass window sandwiches. The present invention provides the convenience of hot melt application with the good structural properties of polysulfide rubber.

U.S. Pat. No. 3,243,403, a copy of which accompanies this application, is concerned with and claims the cure of thiol terminated liquid polysulfide polymers with dibutyl tin oxide and the cured product obtained thereby. There is no teaching or suggestion in said patent or in any prior art of which applicant is aware that dibutyl tin oxide cured polysulfide polymers have any different reaction to the application of heat and pressure to them than other known cured polysulfide rubbers.

SUMMARY OF THE INVENTION

The invention provides a process for the preparation of a formed article of manufacture comprising a cured rubber based on a thiol terminated liquid polysulfide polymer cured with a dialkyl tin oxide which comprises:

(a) extruding said cured rubber through a die under heat and pressure; and (b) allowing the extruded rubber of step (a) to cool and solidify.

The tangible embodiments produced by the process aspect of the invention possess the inherent physical properties of being rubbery solids being substantially insoluble in water and common industrial solvents such as aliphatic and aromatic hydrocarbons, esters, ketones and alcohols and being swellable by similar solvents to only a slight degree and of having substantially similar physical properties as before extrusion.

The tangible embodiments produced by this process aspect of the invention possess the inherent applied use characteristics of being suitable bases for sealants for architectural purposes, for sealing window glass in buildings and vehicles and for sealing glass sandwiches for insulating windows, and in being suitable for the manufacture of extruded rubber goods such as hosing and belting and the like.

Special mention is made of the process of the invention wherein the dilower alkyl tin oxide is di-n-butyl tin oxide.

The invention also provides a cured rubber based on a thiol terminated liquid polysulfide polymer, said cured rubber being in a condition to undergo plastic flow under pressure with substantial recovery of its preflow physical properties upon cooling which comprises a thiol terminated liquid polysulfide polymer cured with a dilower alkyl tin oxide said cured polymer being maintained at a temperature of from about 100° C. to about 300° C.

The invention also provides a process for the preparation of an article of manufacture comprising a substrate having on at least one surface thereof a cured rubber based on a thiol terminated liquid polysulfide polymer cured with a dilower alkyl tin oxide which comprises:

(a) extruding said cured rubber through a die under heat and pressure onto at least one surface of a substrate; and (b) allowing said extruded rubber of step (a) to cool and solidify.

DESCRIPTION OF THE PREFERRED EMBODIMENT

The manner of practicing the process of the invention will now be illustrated with reference to a specific embodiment thereof, namely, its practice on a dibutyl tin oxide cured polysulfide rubber (I) based on a thiol terminated liquid polysulfide polymer of the formula:

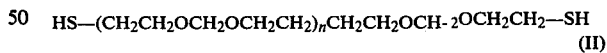

$$HS-(CH_2CH_2OCH_2OCH_2CH_2)_nCH_2CH_2OCH_2OCH_2CH_2-SH$$
(II)

wherein n is sufficient to give an average molecular weight of about 7500 and containing about 0.5% random crosslinking introduced by incorporation of trichloropropane in the original polysulfide polymer condensation.

To prepare I, II may be blended in conventional mixing equipment, conveniently in a Baker Perkins mixer or in a paint roll mill with a curing amount of di-n-butyl tin oxide. After thorough mixing, the blend may then be formed into any desired shape, conveniently by casting in a mold or extruding as a tape and then cured to give I. The cure may be at room temperature or it may be accomplished more quickly at elevated temperatures, conveniently up to about 70° C. The extrusion of I under heat and pressure may be performed by conventional equipment. I may be extruded for example through a heated screw type extruder gun fitted with an outlet die or nozzle of the desired shape. A typical example of a commercial device of this type is a Hardemann "P" Shooter. The extrusion may be directly onto the desired location of the surface of the desired substrate, for example, the sealant channel between two panes of an insulation glass sandwich.

One skilled in the art will recognize that in addition to the polysulfide polymer II illustrated hereinabove for the preparation of I other polysulfide polymers of the formula:

HS—(RSS)$_n$—R—SH wherein n is 4 up to a value sufficient to give a molecular weight of about 10,000, which may be uncrosslinked or contain up to about 2% crosslinking and wherein R is a hydrocarbon, oxahydrocarbon or thiahydrocarbon diradical such as the ethylene radical

—CH$_2$CH$_2$— the butylene radical

—CH$_2$CH$_2$CH$_2$CH$_2$— the diethylether diradical

—CH$_2$CH$_2$OCH$_2$CH$_2$— the diethylformal diradical

—CH$_2$CH$_2$OCH$_2$OCH$_2$CH$_2$— and the like will be suitable for the preparation of analogous compounds of the invention. U.S. Pat. No. 2,466,963 teaches the synthesis of these types of polymer. A number of these polymers are commercially available from Thiokol Corporation.

One skilled in the art will also recognize that in addition to the di-n-butyl tin oxide illustrated for the practice of the invention, other dilower alkyl tin derivatives either commercially available or readily synthesized by known methods will be suitable for the preparation of analogous compositions to I.

One skilled in the art will similarly recognize that in addition to the Hardemann "P" Shooter illustrated, any other hot extruding apparatus capable of heating I or its analogs to the desired extrusion temperature and maintaining only a short dwell time at that temperature, conveniently 3 minutes or less, will be suitable. Similarly, the substrate may be any common architectural material in addition to the glass illustrated. Suitable materials may be wood, steel, aluminum, concrete, terrazzo, ceramic, stone and the like.

In the formulation of extrudable compositions analogous to I, the use therein for particular applications of known extenders, fillers, lubricants, plasticizers, flow control and sag control agents, adhesive additives, reinforcing agents and the like, already contemplated by the art as suitable for particular applications is contemplated herein and in the appended claims.

As used herein and in the appended claims, the term lower alkyl means a straight, branched chain or cyclic hydrocarbon radical of from 1 to about 8 carbon atoms. Illustrative thereof but without limitation are methyl, ethyl, i-propyl, t-butyl, n-heptyl, cyclohexyl and 2-ethylcyclohexyl.

The curing amount of dilower alkyl tin oxide will be from about 5 parts to about 200 parts by weight (pbw) per hundred pbw polysulfide polymer preferably about 0.7 to about 2.2 moles most preferably about 0.8 to about 1.2 moles of dilower alkyl tin oxide per mole of polysulfide polymer.

The temperature of extrusion is not especially critical but will be any elevated temperature at which sufficient flow in the cured rubber may be obtained at pressures within the capacity of the particular extrusion equipment employed but below that at which substantial permanent degradation occurs in a test sample of the particular formulation. Conveniently these may range from about 100° C. to about 400° C., preferably about 145° C. to about 260° C.

The following examples further illustrate the best mode contemplated by the inventor for the practice of his invention.

EXAMPLE 1

Polysulfide polymer II (52.8 g) and a mixture of di-n-butyl tin oxide (10 pbw) and a liquid acid condensed α-methyl styrene (average trimer) plasticizer (15 pbw) (4.4 g) are mixed and the mixture allowed to cure at room temperature. After cure, the compound has a Shore A hardness of 30. Warming a sample on a melting point apparatus gives a softening point (point at which a microspatula can just penetrate the surface) of 145° C., a liquid point (point at which a microscope cover glass moves freely in contact with the surface) of 250° C. and a point of noticeable discoloration of 280° C.

EXAMPLE 2

Polysulfide polymer II and the di-n-butyl tin oxide/plasticizer mixture of Example 1 are mixed in the proportions indicated below and the mixtures cured at room temperature and at 70° C. Properties are also determined on those formulations which cured.

|  | Formulation - Mole Ratio (Quantity - pbw) | | | |
| --- | --- | --- | --- | --- |
|  | 1/1 | 1/0.75 | 1/0.5 | 1/0.25 |
| Ingredient |  |  |  |  |
| II | 100.0 | 100.0 | 100.0 | 100.0 |
| Dibutyl tin oxide/ plasticizer | 8.3 | 6.2 | 4.1 | 2.1 |
| Room Temp. Cure | 3 hrs.sft. | — | — | — |
| 70° C. cure | ¼–½ hr. | 1 hr. | 2 hrs. | overnight |
| Hardness (Shore A) | 35 | 30 | 5 | soft tacky |
| Elevated Temperature Behaviour |  |  |  |  |
| Initial Softening Point | 135° C. | 165° C. | — | — |
| Liquid Point | 200° C. | 240° C. | — | — |
| Discoloration | None at temperatures reached | | | |

A small portion of the 1/0.75 cure ratio cured polymer is treated at 150° C. for 2 hours and another at 200° C. for ½ hour. Both samples flowed and showed no apparent discoloration or loss of strength. The 150° C. sample adhered well to a tin surface and the 200° C. sample adhered well to a glass surface.

EXAMPLE 3

A diethyl formal based thiol terminated liquid polysulfide polymer of molecular weight 4000 and 0.5% crosslinking (III) and a diethyl formal based thiol terminated liquid polysulfide polymer of molecular weight 4000 and 2% crosslinking (IV) are cured with the dibutyl tin oxide/plasticizer mixture of Example 1. Properties of the cured material are determined.

| Ingredient | Quantity (pbw) | |
|---|---|---|
| III | 100 | 100 |
| IV | | 100 |
| Dibutyl tin oxide/plasticizer | 15.5 | 15.5 |
| 70° C. oven cure | 18 hrs. | 18 hrs. |
| Hardness (Shore A) | 20 | 24 |
| Elevated Temperature Properties | | |
| Initial Softening | 125° C. | 135° C. |
| Liquid Point | 230° C. | 235° C. |
| Discoloration | 275° C. | — |

Samples are placed in 200° C. oven 15 minutes.
Cured III flowed and foamed slightly, recovered original properties OK.
Cured IV flowed and foamed slightly, recovered original properties OK.

1 day at 212° F.—slight

Gunnability

After 5 minutes at 250° F.—poor
After 5 minutes at 300° F.—good
After 5 minutes at 370° F.—very good (much gassing)

Hardness (Shore A)

After 30 min. at 302° F. & ½ hr. at R.T.—25
After gunning at 300° F. & ½ hr. at R.T.—~28

Adhesion 1 week after gunning at 300° F.

Glass—adhesive bond failure
Aluminum—adhesive bond failure

Test window units are fabricated with the sealant:

| | Unit | | |
|---|---|---|---|
| | A | B | C |
| Original dew point (°F.)(1) | * | 68 | −70 |
| Dewpoint after 2 weeks at | — | ** | −64 |

| Ingredient | Formulation (Quantity - pbw) | | | | | | | | |
|---|---|---|---|---|---|---|---|---|---|
| | 1 | 2 | 3 | 4 | 5 | 6 | 7 | 8 | 9 |
| Polysulfide polymer II | 100 | 100 | 100 | 100 | 100 | 100 | 100 | 100 | 100 |
| Dibutyl tin oxide/plasticizer (Ex.1) | 6.2 | 7.2 | 8.2 | 7.2 | 8.2 | 9.2 | 9.2 | 10.2 | 11.2 |
| Calcium carbonate | 90 | 90 | 90 | 90 | 90 | 90 | 90 | 90 | 90 |
| Titanium dioxide | 10 | 10 | 10 | 10 | 10 | 10 | 10 | 10 | 10 |
| CUMAR™ P-25 (Coumarone-indene resin—Neville Chem. Co. | — | 20 | 20 | — | — | 15 | 20 | 20 | 20 |
| CERECLOP™ 51L (chlorinated paraffin—ICI Ltd.) | — | — | — | 25 | 25 | 10 | — | — | — |
| CURE IS AT 302° F. FOR 30 MINUTES | | | | | | | | | |
| Extrusion Properties | | | | | | | | | |
| Room Temperature | | Ext. prop. | | | all samples not good at this temp. | | | | |
| After 5 min. 212° F. | G | G | NG | G | NG | | borderline | | NG |
| After 5 min. 350° F. | G | G | G | G | G | G | G | G | NG |
| Hardness (Shore A) | | | | | | | | | |
| After 30 min. 302° F. | ~5 | ~5 | ~9 | <5 | ~5 | 10 | 10 | 11 | ~15 |
| After 30 min. 302° F. + 1 day | ~5 | ~5 | ~10 | <5 | ~5 | ~12 | 10 | 12 | 18 |
| 30 min. 302° F. + 1 day + 5 min. 350° F. | | Very soft and gummy | | | | ~12 | ~10 | ~11 | ~16 |
| Tensile (psi)/Elongation (%) (est) | | | | | | | | | |
| After 30 min. 302° F. | 0/400 | 0/1300 | 5/600 | 0/200 | 5/400 | 10/1500 | | | 12/1500 |
| Adhesion to Aluminum* | | | | | | | | | |
| After 5 min. 350° F. | | | | | | coh. | coh. | coh. | coh. |

*cohesive = sealant ruptures before bond to substrate fails

EXAMPLE 5

Polysulfide polymer II (100 pbw), calcium carbonate (90 pbw), titanium dioxide (10 pbw), A-187 (a silane adhesive additive—Union Carbide) (3 pbw), pentaerythritol tetra(mercaptopropionate) (3 pbw), CHLOROWAX™ 70 (chlorinated paraffin plasticizer—Diamond Shamrock) (30 pbw), a 1:1 by weight mixture of di-n-butyl tin oxide and SANTICIZER™ 278 (a proprietary plasticizer—Monsanto Co.) (15 pbw) and a mixture of MnO2 "D" grade (10 pbw), SANTICIZER 278 (10 pbw) and carbon black (0.6 pts.) (1.5 pbw) are blended. After 30 minutes cure at 302° F., the following properties are determined.

Cold Flow 1 week at Room Temperature—none
1 day at 158° F.—very slight

140° F./100% R.H.
Angular fog    none    —    —

*This test not continued - void in sealant
**Sealant flowed leaving void in channel
Weeks to failure under wet U.V.(2) 1–3
Unit C is cycle tested in an accelerated weathering test(3)
 2 weeks Dewpoint −68° F. (cold flow evident)
 4 weeks Dewpoint −72° F. (cold flow evident (1)The method of determining dewpoint is ASTM E546-75.
(2)This method is described in ASTM E6 pl
(3)This test is described in SIGMA Specification for Sealed Insulating Glass Units SIGMA 65-7-2, 1974 Edition, Sealed Insulating Glass Manufacturers Assn. The repeated cycles consist of one surface of the unit subjected to the following weather cycle:
(a)During the first hour drop temperature from room temperature to −20° F. ± 5° F.;
(b)Hold −20° F. ± 5° F. for second hour;
(c)Raise temperature from −20° F. toward room temperature; chamber temperature may only reach 32° F. during this hour;
(d)4th hour water spray, U.V. exposure and controlled temperature rise from room temperature to 135° F. ± 5° F.;
(e)Heat and ultraviolet, no water 5th hour;
(f)6th hour decrease temperature to room temperature, continue U.V. exposure to end of hour; measure front points at convenient cycle intervals.

| Ingredient | Formulation (Quantity - pbw) | | | | | | |
|---|---|---|---|---|---|---|---|
| | 1 | 2 | 3 | 4 | 5 | 6 | 7 |

| | | | | | | | |
|---|---|---|---|---|---|---|---|
| -continued | | | | | | | |
| Polysulfide polymer II | 100 | 100 | 100 | 100 | 100 | 100 | 100 |
| Calcium carbonate | 90 | 90 | 90 | 90 | 90 | 90 | 90 |
| Titanium dioxide | 10 | 10 | 10 | 10 | 10 | 10 | 10 |
| A-187 | 3 | 3 | 3 | 3 | 3 | 3 | 3 |
| CHLOROWAX® 70 | 30 | 30 | 30 | 30 | 30 | 30 | 30 |
| Di-n-butyl tin oxide/SANTICIZER® 278 (1:1 pbw) | 15 | 15 | 15 | 15 | 15 | 15 | 15 |
| MnO$_2$ "D" grade (10 pbw); SANTICIZER 278 (10 pbw); Carbon Black (0.6 pbw) | 1.5 | 1.5 | 1.5 | 1.5 | 1.5 | 1.5 | 1.5 |
| Pentaerythritol tetra (mercaptopropionate) | — | 1 | 2 | 5 | 3 | 4 | 3.5 |
| Properties | | | | | | | |
| Cold flow at R.T. (1-5 days) | none | none | none | none | none | none | none |
| Cold flow after 10 min. at 158° F. (1-5 days) | none | none | none | none | none | none | none |
| Cold flow after 24 hours 158° F. (1 day) | bad | mod. | mod. | none | slt. | none | slt. |
| Gunnability at 370° F. | v.gd. | v.gd. | v.gd. | fair | good | fair | gd./fr. |
| Hardness Shore A Before Gun. | 30 | 25 | 22 | 33 | 33 | 32 | 35 |

The subject matter which applicant regards as his invention is particularly pointed out and distinctly claimed as follows:

1. A process for the preparation of a formed article of manufacture comprising a cured rubber based on a thiol terminated liquid polysulfide polymer cured with a dialkyl tin oxide which comprises:
   a. extruding said cured rubber through a die under heat and pressure; and
   b. allowing the extruded rubber of step (a) to cool and solidify.

2. A process as defined in claim 1 wherein the dialkyl tin oxide is di-n-butyl tin oxide.

3. A process as defined in claim 1 wherein the dilower alkyl tin oxide is present at from about 0.7 moles to about 2.2 moles per mole of polysulfide polymer.

4. A process as defined in claim 1 wherein the dilower alkyl tin oxide is present at about 0.8 to about 1.2 moles of said dilower alkyl tin oxide per mole of polysulfide polymer.

5. A process as defined in claim 4 wherein the dilower alkyl tin oxide is di-n-butyl tin oxide.

6. A process for the preparation of an article of manufacture comprising a substrate having on at least one surface thereof a cured rubber based on a thiol terminated liquid polysulfide polymer cured with a dilower alkyl tin oxide which comprises:
   (a) extruding said cured rubber through a die under heat and pressure onto at least one surface of a substrate; and
   (b) allowing said extruded rubber of step (a) to cool and solidify.

* * * * *